Nov. 4, 1958   R. T. CORNELIUS   2,858,771
COOLING SYSTEM FOR HYDRAULIC PUMPS
Filed Oct. 27, 1955   2 Sheets-Sheet 1
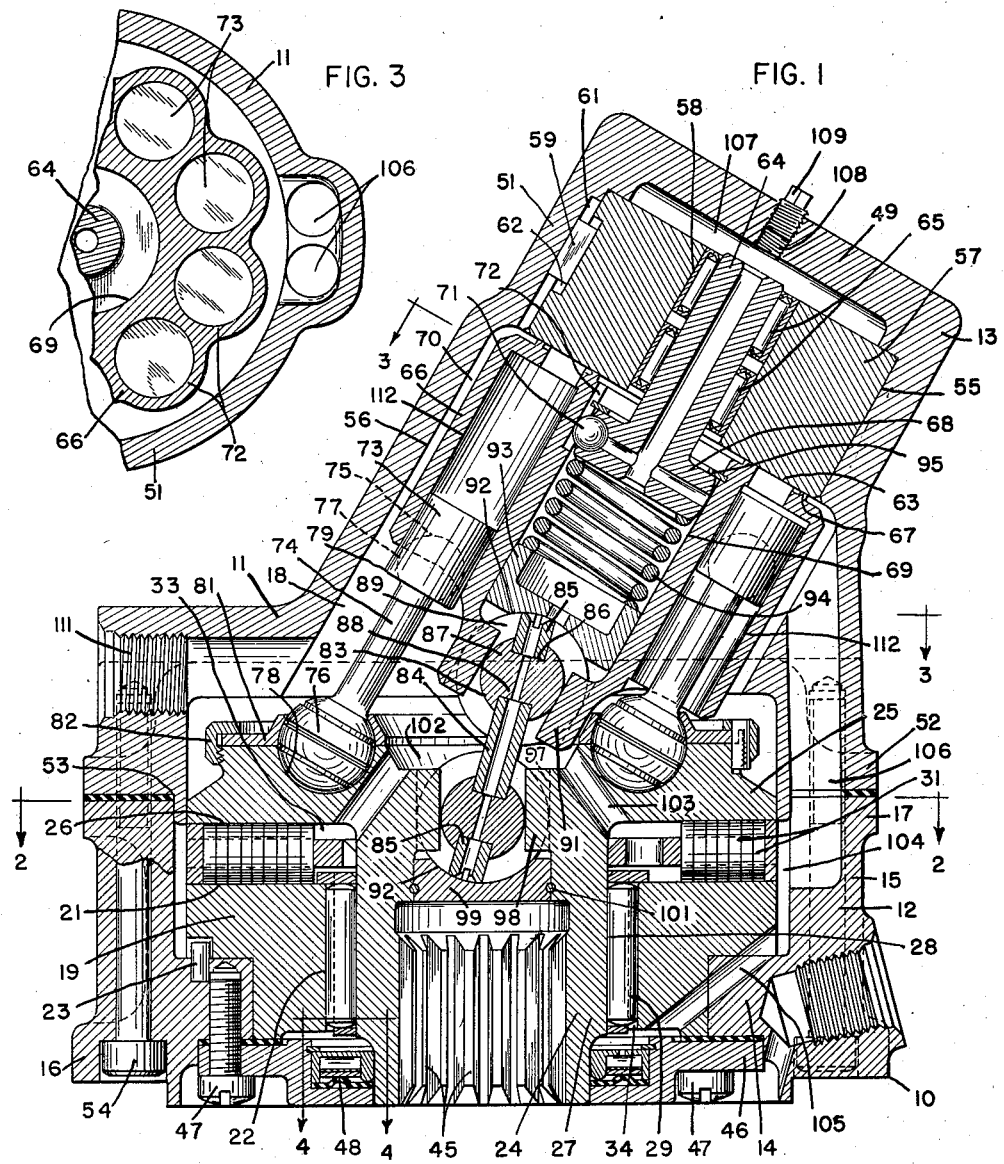
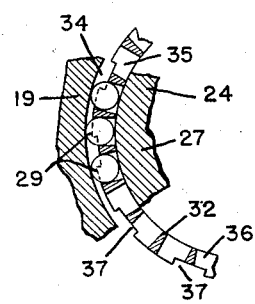
INVENTOR
RICHARD T. CORNELIUS
Caswell & Lagaard
ATTORNEYS Nov. 4, 1958 R. T. CORNELIUS 2,858,771
COOLING SYSTEM FOR HYDRAULIC PUMPS
Filed Oct. 27, 1955 2 Sheets-Sheet 2

INVENTOR
RICHARD T. CORNELIUS

Caswell & Lagaard
ATTORNEYS

United States Patent Office 2,858,771
Patented Nov. 4, 1958

2,858,771

COOLING SYSTEM FOR HYDRAULIC PUMPS

Richard T. Cornelius, Minneapolis, Minn.

Application October 27, 1955, Serial No. 543,116

3 Claims. (Cl. 103—162)

The herein disclosed invention relates to multiple cylinder hydraulic pumps and particularly to construction for cooling the lubricant used in the same.

An object of the invention resides in providing a lubricant circulating system in which the lubricant at the bearings is circulated to a portion of the pump in which heat transfer to the exterior may be more readily had.

Another object of the invention resides in providing a pump having a radial roller bearing and in using the rollers and the cage therefor as an impeller for causing the flow of the lubricant.

An object of the invention resides in providing a construction particularly adaptable to a pump consisting of a base in which a driven rotor is mounted and containing the bearings for supporting the same, and in further providing a dome issuing from the base and having mounted therein a rotatable cylinder block disposed with its axis at an angle to the axis of the rotor and having pistons mounted in the cylinders of said block and actuated by said rotor.

A feature of the invention resides in providing a channel between the base and the dome and in circulating the lubricant through such channel from the base to the dome and back again to cool the same.

Another object of the invention resides in providing a construction for cooling both the radial and end thrust bearings of the pump.

Other objects of the invention reside in the novel combination and arrangement of parts and in the details of construction hereinafter illustrated and/or described.

In the drawings:

Fig. 1 is an elevational sectional view taken on line 1—1 of Fig. 2.

Fig. 3 is a fragmentary plan sectional view of the dome and cylinder block taken on line 3—3 of Fig. 1.

Fig. 4 is a fragmentary detail view taken on line 4—4 of Fig. 1.

Figure 2:
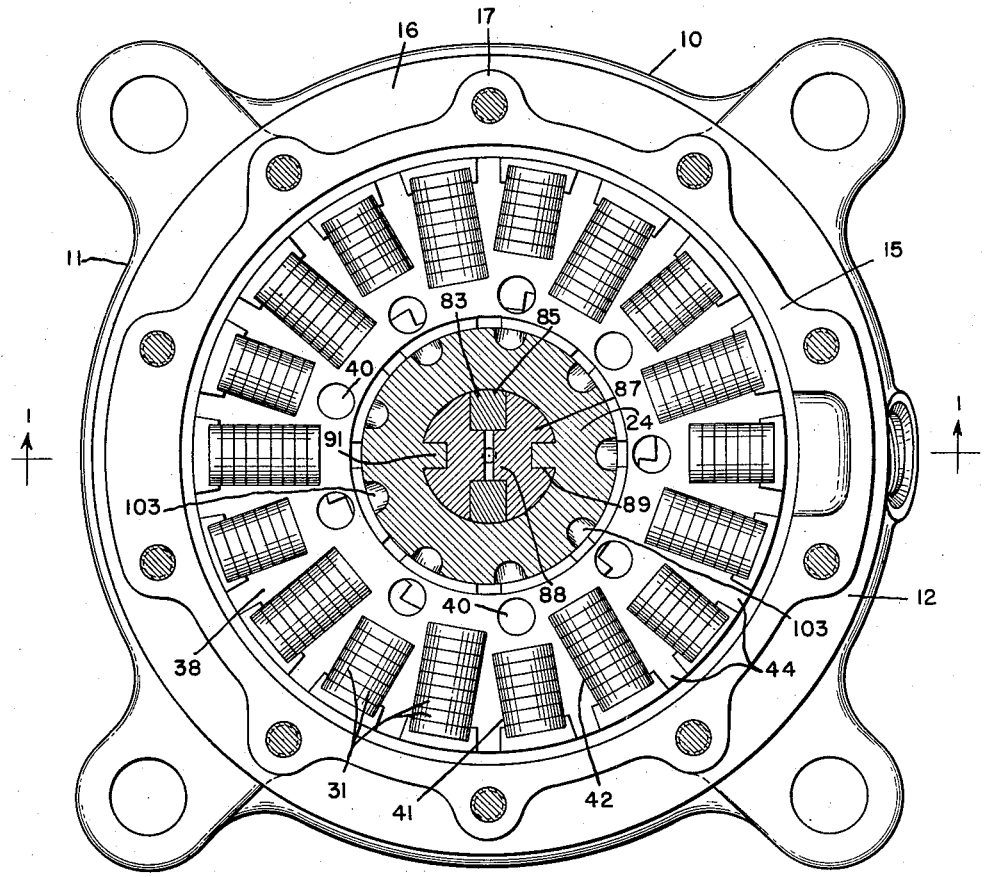
Fig. 2 is a plan sectional view taken substantially on line 2—2 of Fig. 1.

The pump illustrated is indicated by the reference numeral 10 and comprises a case 11 which consists of a base 12 on which a dome 13 is mounted. The base 12 is generally circular in form, being provided with a bottom wall 14 and an annular wall 15 extending upwardly therefrom. Encircling the base 12 is a flange 16 which is adapted to be mounted on the surface of the support to which the pump is to be attached. The upper end of the wall 15 is formed with a rim 17 and to which the dome 13 is bolted. By means of this construction a chamber 18 is formed within the case 11.

Figure 5:
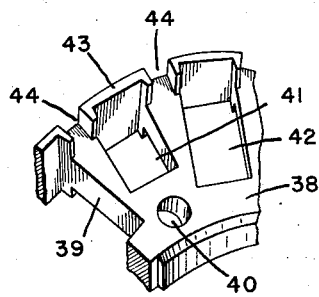
Fig. 5 is a fragmentary perspective view of the cage for the end thrust bearing of the pump.

Within the chamber 18 and in the base 12 is mounted a bearing race 19 which has a radial surface 21 and a cylindrical surface 22. The race 19 is held from rotational movement by means of a dowel pin 23 which enters the bottom wall 14 of the base 12 and extends into said race. Rotatably mounted within the chamber 18 is a rotor 24 which has a flange 25 formed with a radial surface 26. This rotor is also provided with a journal 27 formed with a cylindrical surface 28. The surfaces 21 and 26 are spaced from one another to form a radial space 33 therebetween while the surfaces 22 and 28 are similarly spaced from one another forming a cylindrical space 34 therebetween. Rollers 29 are mounted between the surfaces 22 and 28 in the space 34 and other rollers 31 are mounted between the surfaces 21 and 26 in the space 33. A cage 32, shown in detail in Fig. 4, is received in the space 34 and has pockets 35 formed in the same. The said cage includes end rings 36 which are formed with apertures 37 therein permitting of free circulation of lubricant through the space 34 and between the rollers 29. In a similar manner, the rollers 31 are mounted in a cage 38 disposed in the space 33, and shown in detail in Fig. 5. This cage has a web 39 formed with pockets 41 and 42 to receive the rollers 31. The rollers 31 are of narrow width and a number of such rollers are disposed in each pocket to reduce wear due to the difference in speed of the various rollers along their cylindrical surfaces occasioned by engagement with the surfaces 21 and 26 at different distances from the axis of rotation. Holes 40 extend through said web and conduct fluid through the same. The cage 38 has an end ring 43 which extends between the surfaces 21 and 26 and which holds the cage centrally in the space 33. This end ring is formed with apertures 44 and which permit of free circulation of the lubricant through the space 33 and between the rollers 31. The journal 27 is formed with splines 45 and by means of which a splined shaft may be connected to rotor 24 for the purpose of driving the same. A cap 46 encircles the journal 27 and is attached to the bottom wall 14 of base 12 by means of screws 47. This cap is provided with a seal 48 engaging said journal and by means of which lubricant within the chamber 18 is prevented from leaking out of the same. While the pump 10 has been shown in the drawing as disposed with the axis of the journal 27 vertical, it will be readily comprehended that the case may be turned so that the axis of said journal be horizontal and the pump driven while so disposed. When so mounted the right-hand portion of the pump, as viewed in Fig. 1, would be disposed lowermost.

Dome 13 is substantially cylindrical in form, being provided with an end wall 49 and a cylindrical wall 51. Wall 51 has a flange 52 extending outwardly therefrom and which is arranged at an angle with reference to the wall 36, as best shown in Fig. 1. The flange 52 has a rabbet 53 extending about the same and in which is received the rim 17 of wall 15 of base 12. Bolts 54 extend through the base 12 and are screwed into the flange 52 to clamp the parts securely together. The dome 13 is formed with a bore 55 at its innermost end and an enlargement 56 thereof at its outer end extending up to the flange 52. This bore and enlargement form a portion of the chamber 18 of case 11.

Mounted in the bore 55 of dome 13 is a valve head 57 which is provided with a bore 58 extending centrally through the same. This valve head is held from rotational movement by means of a key 59 received in grooves 61 and 62 in the wall 51 of the dome 16 and in said valve member. The valve head 57 has a valve face 63 which is flat and circular in form. Mounted in the bore 58 is a spindle 64 which is supported for rotation therein by means of pin bearings 65. Disposed within the enlargement 56 of bore 55 is a cylinder block 66. The cylinder block 66 is spaced from the enlargement 56 of bore 55 to form a circulating channel 70 thereabout. This cylinder block has a flat radial face 67 which bears against the face 63 of the valve head 57. The spindle 64 is formed with a spheroidal-shaped head 68 which is received in a bore 69 formed in the cylinder block 66. A ball key 71 imbedded in the head 68 and entering a groove 72 in the cylinder block 66 procures rotation between the spindle 64 and said cylinder block, and forms a universal joint, permitting slight angular movement between the spindle 64 and said cylinder block. The cylinder block 66 is provided with a number of bores 112 which constitute cylinders and which are ararnged in annular formation about the bore 69. Slidably mounted in the bores 112 are pistons 73.

Between the rotor 24 and the pistons 73 are connecting rods 74. These rods have balls 75 and 76 at their ends. The balls 75 are received in sockets 77 formed in the pistons 73, while the balls 76 are received in sockets 78 formed in the flange 25 of rotor 24. The ends 79 of the pistons 73 are turned over to hold the ball 75 in position, while a retainer ring 81 holds the balls 76 in position. A clamp ring 82 screwed on the flange 25 of the rotor 24 holds the ring 81 in position.

The cylinder block 66 is driven from the rotor 24 through a universal joint 83. This joint includes a body 84 constructed of flat bar stock which is formed at its ends with spaced heads 85. The heads 85 have transverse bores 86 extending through the same and which are at right angles to the medial plane of the body 84. In conjunction with the body 84, four caps 87 are employed which are identical in construction. These caps are adapted to overlie the body 84 and have short stub shafts 88 which are received in the bores 86 and which form journals and guide said caps for rotational movement relative to said bores. The journals 88 are of a length somewhat less than half the thickness of the body 72 so that the caps on opposite sides of the body may be rotatably mounted for concentric rotation with respect to the body proper. The outer surfaces of the caps 87 and the adjoining surfaces of the heads 85 are spherical in form so that the assembled structure forms balls at the end of the body 84. The caps 78 are formed with planiform arcuate grooves 89 whose medial planes contain the axes of the respective journals 88. Extending inwardly from the bore 69 of cylinder block 66 are splines 91 which enter the grooves 89 and which form a driving connection between the universal joint and the cylinder block 66. One of the balls formed by the caps 87 and the heads 85 is seated in a socket 92 formed in a plunger 93. This plunger is slidably mounted in the bore 69. A compression coil spring 94 acts between the plunger 93 and the head 68 and urges the said head toward the end of the dome 13. A snap ring 95 attached to the cylinder block 66 and engaged by the head 68 serves to force the said cylinder block toward the valve head 57 and to bring the surfaces 67 and 63 in contact with one another.

The other end of the universal joint 83 is received in a bore 97 formed in the rotor 24. Splines 98 extending inwardly from this bore enter the grooves 89 of certain of the caps 87 of said universal joint and transmit motion from rotor 24 to the joint. The ball formed by these caps is seated on a seat 99 also received in said bore. A snap ring 101 holds the seat 99 in position.

The central portion of the rotor 24 is formed with a cavity 102 communicating with the chamber 18 in case 11. Extending from this cavity and to the radial space 33 are inlet passageways 103. Encircling the bearing race 19 in the space 33 is an annular passageway 104 which communicates with the space 33. Extending through the bearing race 19 and through the base 12 of case 11 are inlet passageways 105. The case 11 is further constructed with a connecting passageway 106 which communicates with the annular passageway 104 and with the annular channel 70.

In the end wall 49 of dome 13 is formed a cavity 107. The end wall 49 has an opening 108 communicating with the cavity 107 and which is closed by means of a plug 109. When the pump has been assembled, the cavity 107 and the entire interior of the cylinder block 66 are filled with lubricant through the opening 108 and the plug 109 inserted in said opening to close the same. Similarly, lubricant is inserted in the chamber 18 through an opening 111 in the dome 13 which is normally closed by a plug not shown.

The operation of the invention is as follows: When the rotor 24 is rotated, the roller bearings 31 and the cage 38 form an impeller which throws the lubricant outwardly and into the annular passageway 104. The flow of lubricant through the pump then is as follows: Lubricant in the chamber 18 enters the cavity 102 and flows through the inlet passageways 103 and into the space 33. The lubricant then passes through this space and through the apertures 44 of cage 38 and into the annular passageway 104. From this passageway the lubricant passes through the connecting passageways 106 and into the annular channel 70. From this channel the lubricant flows back into the chamber 18. At the same time, lubricant entering the annular passageway 104 flows into the outlet passageways 105 and into the space 34. This space being in communication with the space 33, the lubricant returns to said space. It will thus be seen that the lubricant is circulated through both sets of bearings. At the same time the lubricant is circulated about the channel 70 whereby the same is cooled and returned to the bearings for the rotor.

The advantages of the invention are manifest. Great pressures, up to 3,000 pounds to the square inch, can be pumped with the pump and at relatively high efficiency. Due to the pressure exerted by the pistons 73, considerable pressure is exerted on the rotors 31 forming the end thrust bearing for the rotor 24. This causes considerable heat as compared to the heat generated by the cylinder block, and the cylinder block and dome are relatively cool as compared to the base. By the circulating system shown, the lubricant may be circulated through the heat transfer channels and the heat dissipated through the walls of the dome. With the invention, no special pumping or circulating means are required to procure the desired circulation, thus making it possible to construct the pump light in weight and rendering the pump suitable for airplane installation.

Changes in the specific form of the invention, as herein described, may be made within the scope of what is claimed without departing from the spirit of the invention.

Having described the invention, what is claimed as new and desired to be protected by Letters Patent is:

1. In a pump, a case having a base and a dome extending outwardly therefrom, said case being formed with a chamber in the same containing a lubricant, a race in said base having a bore providing a cylindrical surface and a radial surface intersecting the same, a rotor in said base having corresponding cylindrical and radial surfaces spaced from the surfaces of said race to form a cylindrical space and a radial space, said race being spaced from a wall of said base to form an annular passageway communicating with said radial space, a roller bearing cage in said cylindrical space, rollers received within said cage and engaging said cylindrical surfaces, a roller bearing cage in said radial space, rollers received in said cage and engaging said radial surfaces, said cages having apertures therein for conducting the lubricant through said spaces, a cylinder block mounted for rotation in said dome and with its axis at an angle with the axis of said rotor, said cylinder block having a number of bores parallel to the axis of rotation thereof, pistons slidable in said bores, connecting rods acting between said rotor and pistons and procuring reciprocation of said pistons, means for driving said cylinder block from said rotor, said cylinder block being spaced from a wall of said dome to provide an annular channel therebetween communicating with said chamber, said case at the outermost portion thereof having a connecting passageway communicating with said annular passageway and said annular channel, and said rotor having an inlet passageway communicating with said chamber and with said radial space at its innermost portion and a discharge passageway communicating with said cylindrical space and with the annular passageway, whereby said radial cage and the rollers therein form an impeller circulating the lubricant from the chamber in the case through the inlet passageway in said rotor, through said radial space, into said annular passageway, through the connecting passageway in said case, into said annular channel and back into said chamber, and from said annular passageway through said outlet passageway through said cylindrical space and to said radial space.

2. In a pump, a case having a chamber therein containing a lubricant, a bearing in said case, a rotor mounted for rotation on said bearing, a race in said case having a radial surface normal to the axis of said bearing, said rotor having a radial surface corresponding to and spaced from the radial surface of said race to form a radial space therebetween, a cage within said space, roller bearing members in said cage and engaging said surfaces, said cage having apertures therein for conducting the lubricant through said space, a cylinder block mounted for rotation in said case and driven by said rotor, said block being spaced from a certain wall of the case in heat transfer relation with the exterior to form an annular channel thereabout communicating with said chamber, said case having a connecting passageway communicating with said space at the outermost portion thereof and with said annular channel at the end thereof remote from said space, and said rotor having an inlet passageway communicating with said radial space at the innermost portion thereof and with said chamber, whereby said cage forms an impeller circulating the lubricant from the chamber in the case through the inlet passageway in said rotor, through the radial space, into the connecting passageway, into the annular channel and back to said chamber.

3. In a pump, a case having a chamber therein containing a lubricant, a bearing in said case, a rotor mounted for rotation by said bearing, a race in said case having a radial surface normal to the axis of said bearing, said rotor having a radial surface corresponding to and spaced from the radial surface of said race to form a radial space therebetween, roller bearing members in said space and engaging said surfaces, a cylinder black mounted for rotation in said case and driven by said rotor, said block being spaced from a certain wall of the case in heat transfer relation with the exterior to form an annular channel thereabout communicating with said chamber, said case having a connecting passageway communicating with said space at the outermost portion thereof and with said annular channel at the end thereof remote from said space, and said rotor having an inlet passageway communicating with said radial space at the innermost portion thereof and with said chamber, whereby said roller bearing members form an impeller circulating the lubricant from the chamber in the case through the inlet passageway in said rotor through the radial space, into the connecting passageway, into the annual channel and back to said chamber.

References Cited in the file of this patent

UNITED STATES PATENTS

| | | |
|---|---|---|
| 2,272,771 | Hawley | Feb. 10, 1942 |
| 2,307,719 | Hawley | Jan. 5, 1943 |
| 2,331,694 | Jeffrey | Oct. 12, 1943 |
| 2,621,852 | Pisa | Dec. 16, 1952 |
| 2,674,191 | Ifield | Apr. 6, 1954 |
| 2,737,341 | Bitzer | Mar. 6, 1956 |